United States Patent [19]

Pollitt

[11] Patent Number: 4,926,984

[45] Date of Patent: May 22, 1990

[54] HYDRAULIC SHOCK ABSORBER WITH NONLINEAR PROPERTIES

[76] Inventor: Gary M. Pollitt, 45050 Cameron Rd., Temecula, Calif. 92390

[21] Appl. No.: 364,967

[22] Filed: Jun. 12, 1989

[51] Int. Cl.$^5$ .............................................. F16F 9/12
[52] U.S. Cl. .................................... 188/310; 188/306
[58] Field of Search ............... 188/130, 290, 293, 296, 188/306, 310

[56] References Cited

U.S. PATENT DOCUMENTS

| | | | |
|---|---|---|---|
| 1,564,227 | 12/1925 | Flentje | 188/310 |
| 1,596,757 | 8/1926 | Murray et al. | 188/306 X |
| 1,868,859 | 7/1932 | Tippen | 188/310 X |
| 1,950,235 | 3/1934 | Fieldman | 188/306 |

FOREIGN PATENT DOCUMENTS 608835 9/1960 Italy ..................... 188/293

*Primary Examiner*—Duane A. Reger
*Attorney, Agent, or Firm*—John J. Murphey

[57] ABSTRACT

A novel hydraulic, fluid-filled shock absorber including a shock absorber chamber bounded by cylindrical walls and opposed, spaced-apart first and second end plates including first means for anchoring the chamber to a frame, a shock absorber shaft passing axially through the chamber and end plates including second means for connection to a separate oscillatory member, a work disc pivotally mounted transverse to the shaft inside the chamber intermediate the first and second end plates, a baffle fixedly mounted inside the chamber in fluid-sealing relationship therein having at least one aperture formed therethrough, a wiper baffle axially mounted to the shaft intermediate the disc and the first end plate extending outward into fluid-sealing relationship against the chamber walls to effectively divide the chamber into first and second subchambers so that rotation of the shaft forces fluid from one subchamber through the aperture into the other subchamber, a first pivot pin extending inward from the second end plate through a circumferential slot formed in the work disc, a second pivot pin extending inward from the work disc spaced-apart from the first pivot pin, a lug pivotally received on the first pivot pin and slidingly received on the second pivot pin having an arm extending outward around the inside of the chamber to a distal end adjacent the chamber walls when the wiper baffle is in a first position apart from the fixed baffle and the first pivot pin is at one end of the slot and a moveable link attaching the distal end of the lug to the wiper baffle for moving the baffle through the fluid causing the lug to pivot about the first pin and rotate the disc about the chamber walls to provide variable fluid flow from one subchamber to the other subchamber as a function of shaft rotation.

12 Claims, 5 Drawing Sheets

HYDRAULIC SHOCK ABSORBER WITH NONLINEAR PROPERTIES

BACKGROUND OF THE INVENTION

1 Field of the Invention

This invention relates to shock absorbers of the hydraulic type. More particularly, it relates to rotary shock absorbers wherein an internal vane attached one part of the shock absorber rotates at a variable rate in a fluid-filled cylindrical chamber to force the fluid under pressure through one or more orifices located in a baffle thereby providing shock-dampening properties. This invention finds special adaptation and use in the field of motorcycles.

2 Description of the Prior Art

Shock absorbers are devices that dampen or attenuate the shock introduced to a vehicle when the wheels strike projections or potholes in the roadway. Shock absorbers are normally used in conjunction with springs to assist in dampening the shock for the purpose of providing a more comfortable ride in the vehicle.

Shock absorbers are constructed in two main types. The elongated "cylinder-piston and rod" type is the more common and comprises an axially aligned cylinder filled with a fluid, a piston slidably received therein and a rod attached to the piston wherein the piston moves through the fluid, transferring fluid from above to below the piston, or vice versa, through various orifices in the piston, either of a set size or under spring tension to provide for a greater opening depending upon the intensity of the shock applied to the rod. These devices are used where there is sufficient space provided between the vehicle frame member and the oscillatory member to position the shock for reciprocating extension therebetween.

The other general type, namely the rotary-vane shock absorber, comprises a fluid-filled cylinder containing a fixed baffle and a moveable vane thus dividing the cylindrical chamber into two subchambers. One or more apertures are provided in either the baffle or the vane or both so that a torque applied to a rotatable center shaft through a lever arm connected to an oscillatory member of the frame will cause them to move closer together or further away from each other forcing fluid through the orifices from one subchamber to another thereby attenuating the shock occasioned to the lever arm.

For the most part, rotary vane shock absorbers are linear in response as the vane is attached directly to the center shaft without restraint thereby providing for direct application of torque, coming from the oscillatory member through a lever arm connected to the shaft, to the vane and through to the fluid to force the fluid through the orifice. While these shock absorbers find use in various areas, especially in crowded areas where imposition of the long cylindrical shock absorber would be difficult, there has not been much development beyond the mere linearity of their construction.

Nonlinearity or nonlinear response in hydraulic shock absorbers is often desired to provide a soft ride at low vehicle speeds, where movement of the pivot arm is substantial, and thereafter to provide a stiffer ride at high speeds when movement is to be minimized so that the vehicle holds better to the roadway. This property, while existing in cylinder-piston and rod type shock absorbers, is substantially absent in the vane type. There is a definite need, therefore, for a rotary vane-type hydraulic shock absorber displaying non-linear shock absorbing qualities.

Especially in certain vehicles, such as motorcycles, that are subjected to high speeds and high shock loads, there is the need for a stout, rotary-vane type hydraulic shock absorber for use in the crowded area of the motorcycle frame that will involve less travel than in normal cylinder-piston and rod shock absorbers where the deflection of the piston rod is often created due to the excessive loads applied to the oscillatory member. Further, because virtually all of the rotary-vane type shock absorber components are housed in a sealed, cylindrical chamber filled with lubricating oil, the parts are not subject to corrosive environments as are the piston-type shock absorbers. Finally, in such vehicles as motorcycles, which are ridden over a variety of surfaces under different conditions, ranging from soft rides on smooth surfaces to hard rides on very rough surfaces, there is a need for a shock absorber that displays the property of having the ride characteristics adjustable from outside the shock absorber so that by merely twisting or turning a dial, bolt or other element to make some manual adjustment, a complete change in the ride may be obtained. These sorts of functions are not found in the elongated cylinder-piston and rod type shock absorber.

SUMMARY OF THE INVENTION

This invention comprises a relatively small, compact rotary-vane type hydraulic shock absorber wherein the travel of the shock absorber "operating" shaft is nonlinear, i.e., varies with increasing rotation of the shaft from a set position. Further, this inventive shock absorber houses almost all of the components within a fluid-filled sealed cylindrical chamber so as to protect them from the harsh environments normally encountered in motorcycle activities. Further, this shock absorber is compact thereby allowing its use in crowded areas of the motorcycle frame not readily adaptable to installation of the elongated cylinder-piston and rod type shock absorber. Still further, this inventive shock absorber displays the ability to vary the overall ride of the shock absorber by manually adjusting a knob or other device from outside the shock absorber thereby eliminating disassembly of the components.

These objects are accomplished by providing a fluid-filled cylindrical chamber wherein a fixed baffle is mounted in the cylinder and a moveable vane is mounted to rotary center shaft in the cylinder thereby effectively dividing the chamber into two subchambers. A unique rotating work disk is provided inside the chamber for rotation with the operating shaft independent of the center shaft. A lug is pivoted between one fixed end of the chamber and the work disk and linked to the moveable vane thereby providing nonlinear rotation of the vane within the hydraulic-filled chamber as a function of operating shaft rotation. Means are provided for adjusting the aperture in the fixed baffle from outside the chamber for varying the amount of fluid that may pass across the baffle as a function of operating shaft rotation thereby providing the unique characteristic of adjustment to the ride from outside the shock absorber.

Accordingly, one object of this invention is to provide an hydraulic rotary vane type-shock absorber with nonlinear shock absorbing capabilities. Other objects of this invention include a small, compact rotary vane-type shock absorber for installation in vehicle frame areas generally not large enough to accept the elongated cylinder-piston and rod type of shock absorber; a shock absorber whose components are housed within a sealed hydraulic fluid-filled chamber thereby preventing deterioration due to exterior changing environments, a rotary vane-type shock absorber of rugged construction that does not display the typical columnar deflection generally associated with shock loaded elongated cylinder-piston and rod type shock absorber; and, a rotary vane-type shock absorber that may be made of lower cost materials due to the fact that the components are housed in a protective oil-filled chamber.

These and other objects of the invention may be determined from a close reading of the Description of the Preferred Embodiment that follows taken in conjunction with the drawings appended hereto. The scope of protection sought by the inventor may be gleaned from a fair reading of the claims that conclude this Specification.

DESCRIPTION OF THE PREFERRED EMBODIMENT

Figure 1:
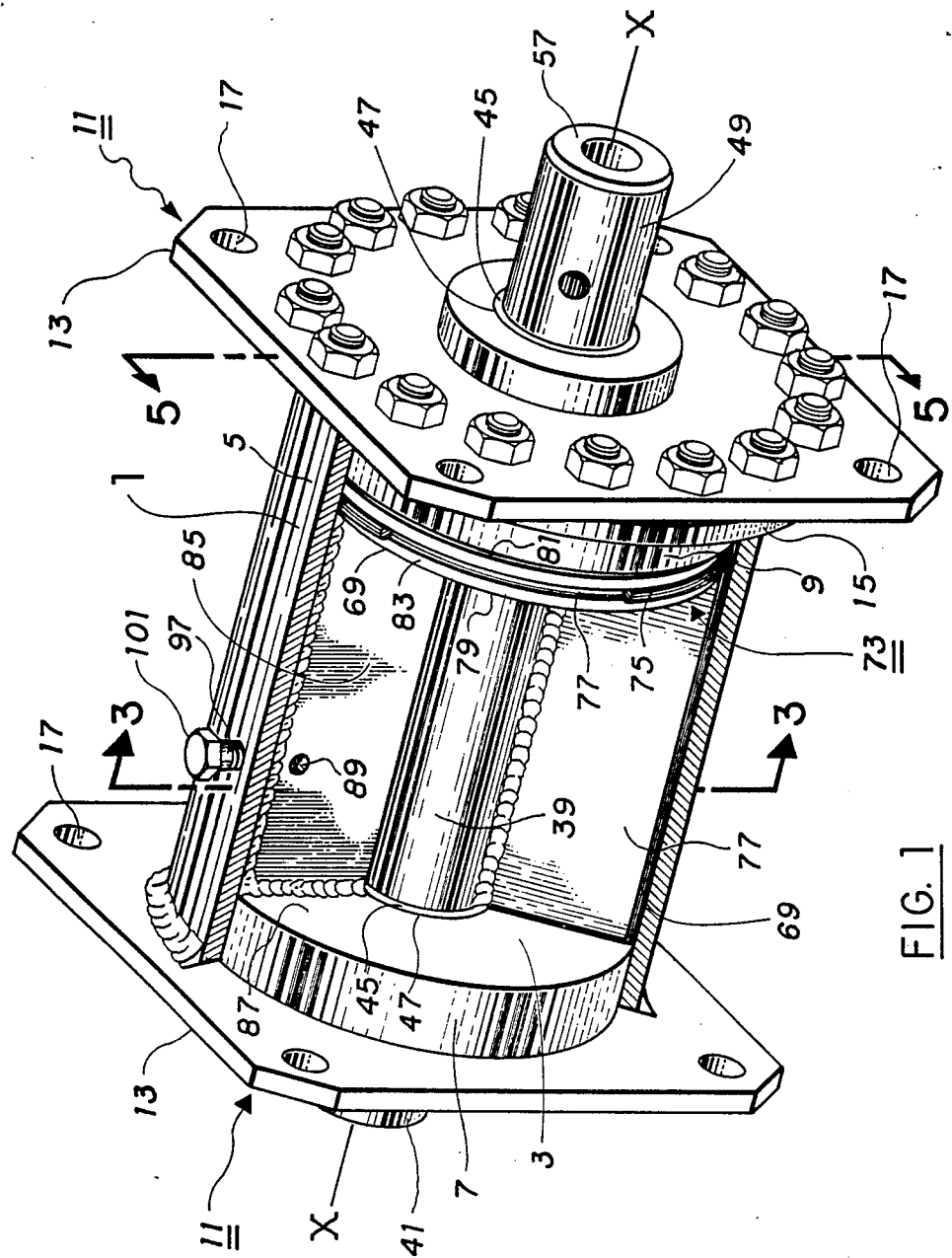
FIG. 1 is a perspective view of the preferred embodiment of this invention with approximately one-half of the cylinder wall removed for clarity.
Figure 2:
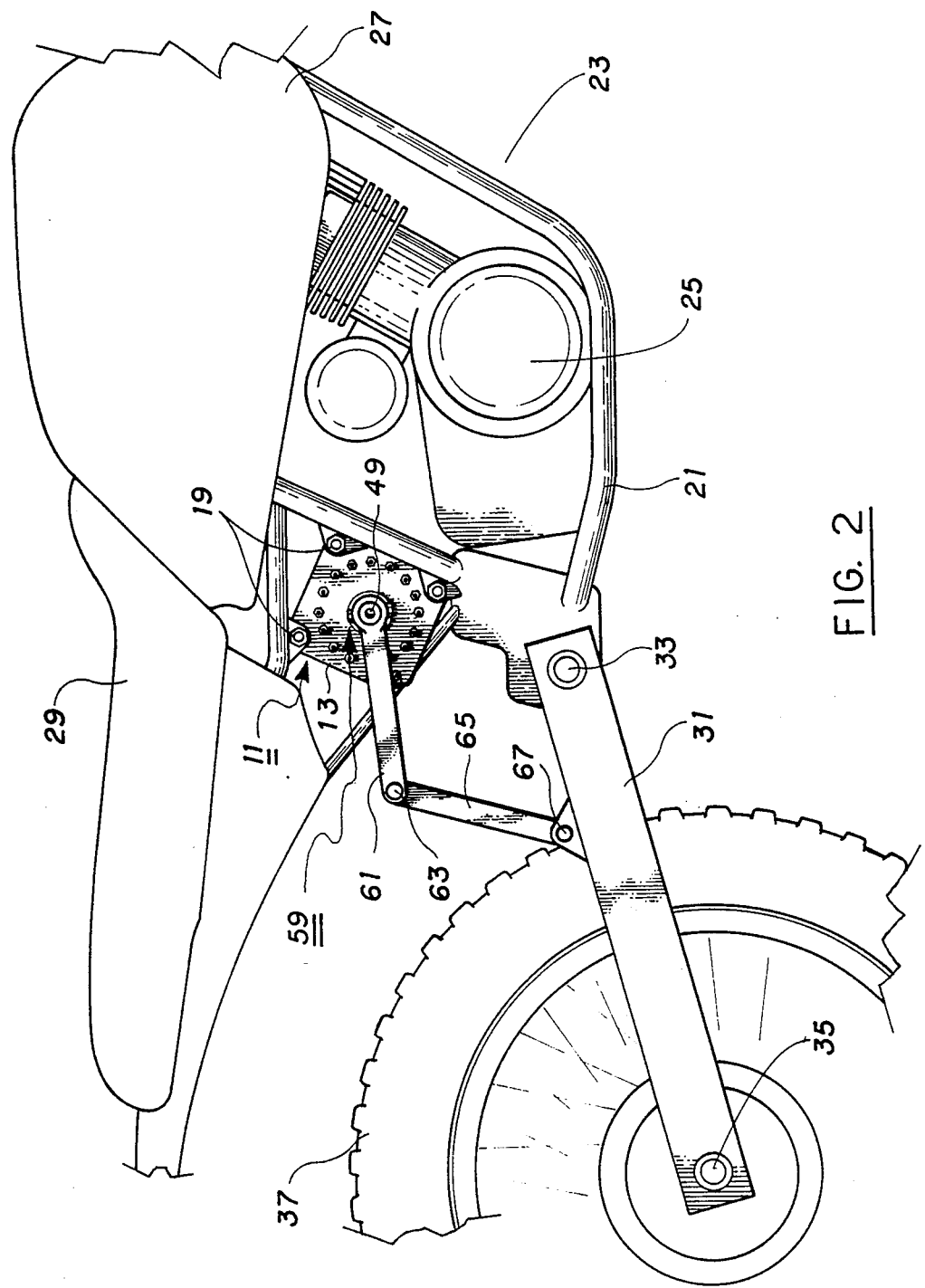
FIG. 2 is an illustrative side view of a typical motorcycle showing the use of this inventive shock absorber in the crowded area adjacent the engine compartment.

Referring to the drawings, wherein like elements are identified by like numerals throughout the five Figures, as shown in FIGS. 1 and 2, the shock absorber of this invention is shown at 1 to generally comprise a fluid-filled shock absorber chamber 3 bounded and enclosed by cylindrical walls 5 that span between opposed, spaced-apart first and second chamber end plates 7 and 9. Means 11 is provided to mount shock absorber 1 to one portion of a vehicle such as a motorcycle. Means 11 is shown in FIGS. 1 and 2 to comprise a pair of spaced-apart flat plates 13 attached to cylinder walls 5 through direct welding, as shown with respect to first end plates 7, and through a backing ring 15 welded to cylinder walls 5 and bolted to end plate 13 as shown with respect to second end plate 9 (see FIG. 5). Included in means 11 is a series of apertures or holes 17 formed therethrough for receipt of mounting bolts 19 to attach shock absorber 1 to the frame 21 of a motorcycle 23.

As shown in FIG. 2, motorcycle 23 includes an engine 25 mounted within frame 21 over which is situated a fuel tank 27 in front of a seat 29. An oscillatory member such as a swing arm 31, is journaled or pivotally attached at a bearing 33 to the rear of frame 21 and extends rearward below seat 29 to a rear wheel bearing 35 that centrally supports a rear wheel and tire 37.

Figure 5:
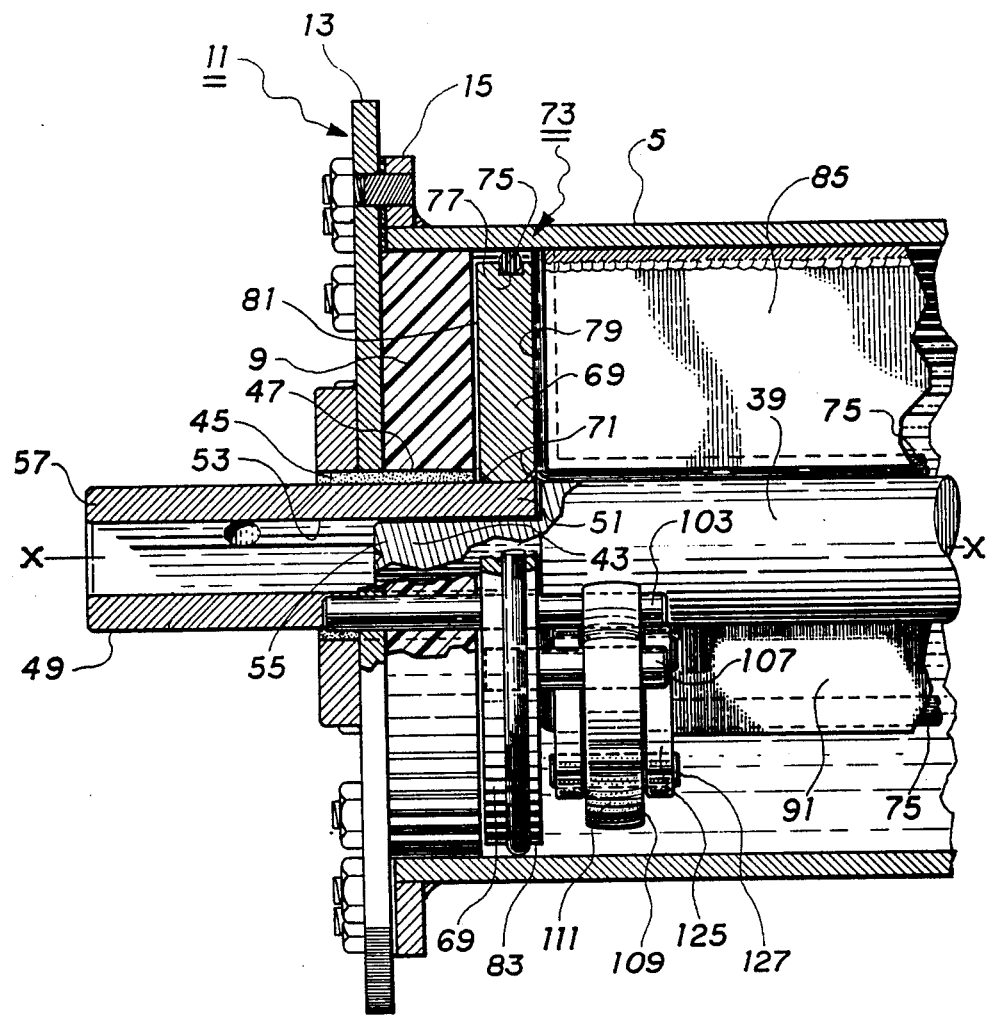

A shock absorber center shaft 39 is shown in FIGS. 1 and 5 axially positioned in chamber 3 along central cylindrical axis x—x, having one end 41 received in first chamber end plate 7 and the other end 43 terminating in chamber 3. End 41 may actually pass through end plate 7 and reside outside chamber 3; however, as it has no exterior function, it may terminate in plate 7. Shaft 39 is made freely rotatable by being journaled in a sleeve bearing 45 received in an aperture 47 formed in end plate 7.

An operating shaft 49 is co-axially aligned along axis x—x having one end 51 in the form of a narrow diameter bore 53 for pivotal receipt therein of a similarly narrow diameter stub 55 formed on center shaft end 39. Shaft 49 passes out through a sleeve bearing 45 received in an aperture 47 formed in second chamber end plate 9 to a distal end 57 wherein means 59 is provided for connecting shaft 49 to an oscillatory member such as swing arm 31.

Means 59 is shown in FIG. 2 to comprise a fixed lever arm 61 extending outward from shaft 49 joined through a pivot pin 63 to a rider arm 65 that is in turn attached to swing arm 31 by pivotal journal 67. As can be seen in FIG. 2, the movement of swing arm 31 about bearing 33 in response to shock loads applied to motorcycle wheel 37 from rocks or other changes in the surface over which it moves, causes rider arm 65 to pivot lever arm 61 about operating shaft 49 and provides rotary axial motion to shock absorber 1.

As shown in FIGS. 1, 3, 4 and 5, a circular work disk 69 is pivotally mounted inside chamber 3 transverse to axis x—x, intermediate first and second end plates 7 and 9, respectively, and fastened securely to operating shaft 49 by weldments 71 adjacent operating shaft end 51. Disk 69 is preferably arranged adjacent second end plate 9. Disk 69 is also arranged in fluid-tight relationship with cylinder walls 5 by sealing means 73 that is shown to comprise an elastomeric seal 75 partially retained in a groove 77 formed approximately midway between disk faces 79 and 81 about circumferential disk edge 83 that extends into fluid-tight contact with cylinder walls 5.

A baffle 85 is fixedly mounted inside chamber 3, such as by welding thereto, axially along cylinder walls 5 and along the inner face 87 of first end plate 7, and arranged in fluid-sealing relationship with center shaft 39 and work disk 69 by sealing means 73. One or more apertures 89 are formed through baffle 85 for passage of fluid therethrough as will hereinafter be more fully explained.

A wiper vane 91 is axially mounted to center shaft 39 such as by welding thereto and extends outward into fluid-sealing contact with cylindrical walls 5, first end plate 7 and work disk 69 through the use of sealing means 73. Fixed baffle 85 and wiper vane 91 therefore effectively divide chamber 3 into first and second subchambers A and B respectively.

Figure 3:
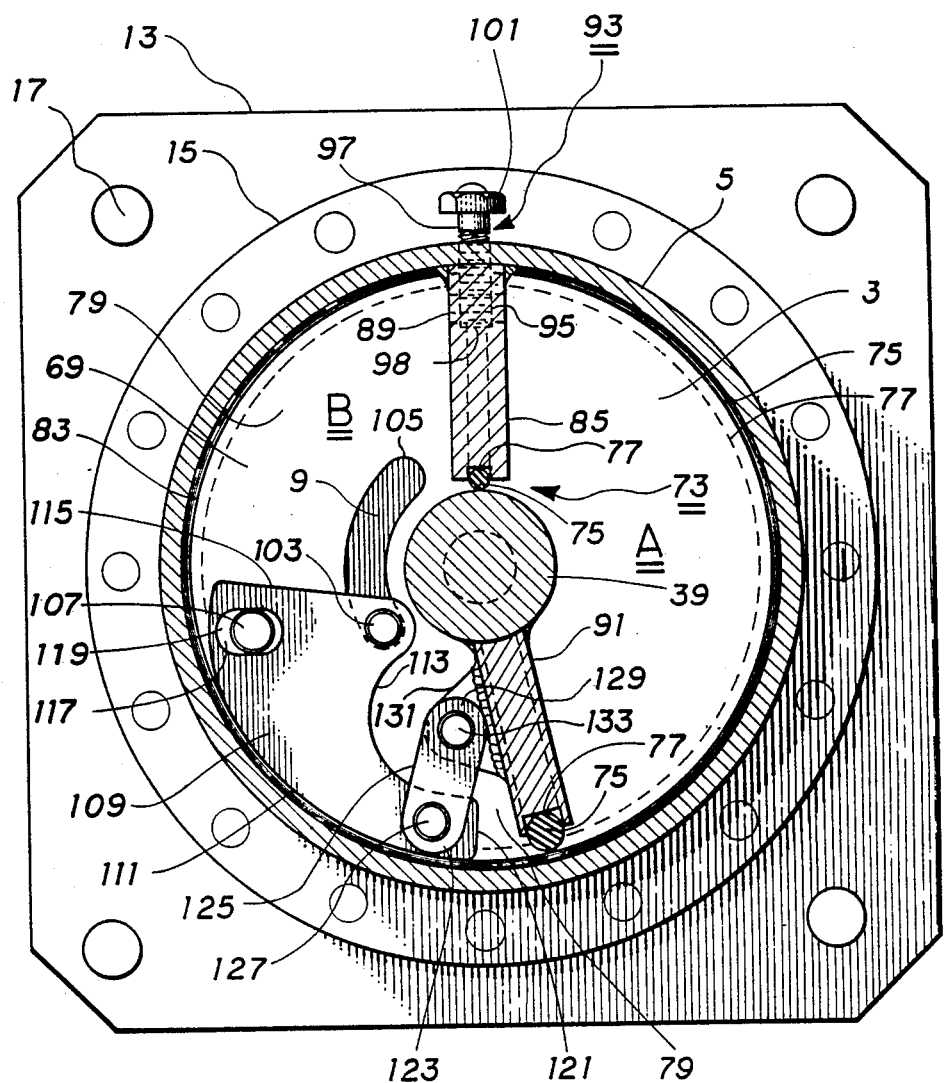
FIG. 3 is a sectional end view of the preferred embodiment taken along lines 3—3 in FIG. 1, showing the internal baffle and vane in one position.
Figure 4:
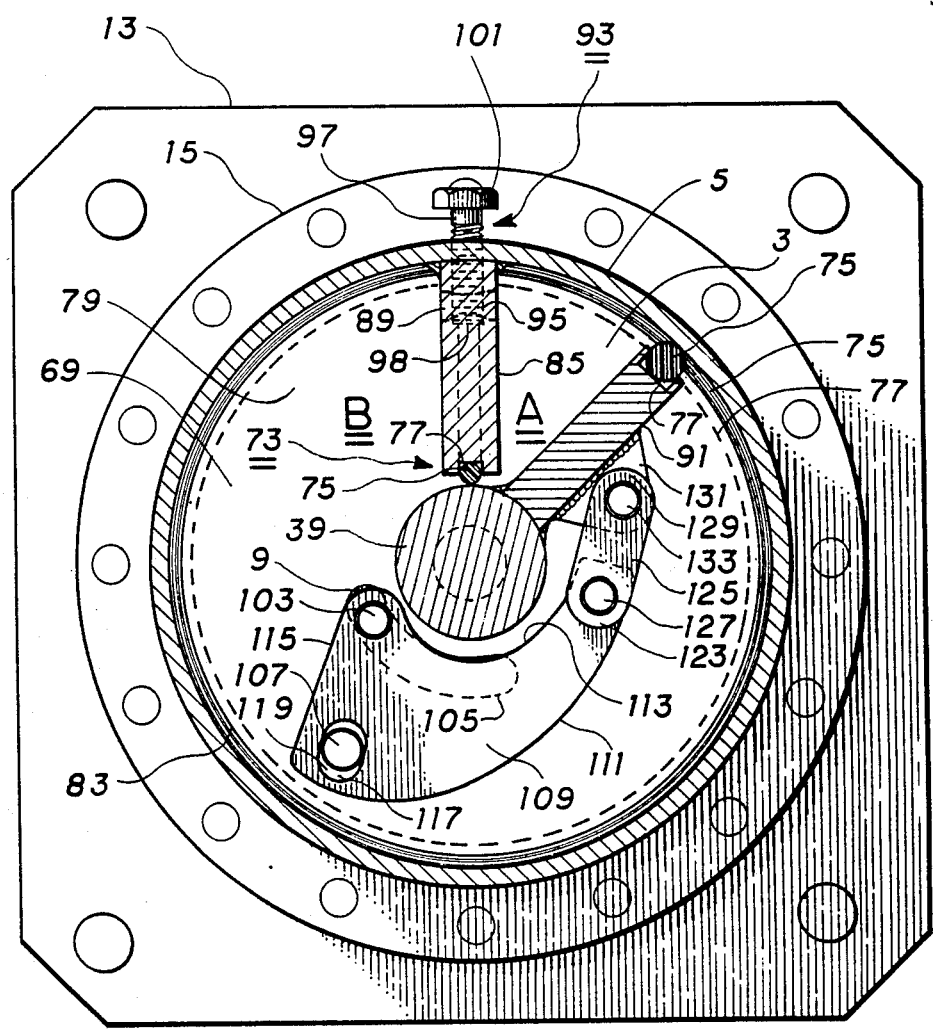
FIG. 4 is another sectional end view of the same embodiment as shown in FIG. 3, showing the vane to have moved relative to the baffle to a second position; and, FIG. 5 is a sectional side view of the preferred embodiment taken along lines 5—5 in FIG. 1, showing interconnection of the various components.

Means 93 is provided in fixed baffle 85 for changing the size of aperture 89. As shown in FIGS. 1, 3 and 4, means 93 includes a threaded bore 95 formed through cylindrical walls 5 and interior of fixed baffle 85 extending into and intercepting aperture 89. A moveable member such as a bolt 97 is threadably received in bore 95 and extends to a distal end 98 that may be brought into aperture 89 by twisting at its head 101 located outside cylindrical walls 5.

A first pivot pin 103 extends from second end plate 9 through a circumferentially curved slot 105, formed in work disk 69, into chamber 3, preferably near axis x—x. A second pivot pin 107 extends from work disk 69 into chamber 3 and is mounted on work disk 69 preferably near the outer edge 83 of disk 69. A lug 109 of roughly triangular shape, having a first outer edge 111 of a curvature near that of cylindrical walls 5, a second inner edge 115 is mounted adjacent work disk 69. An aperture 117 is formed in lug 109 for pivotal receipt therethrough of second pivot pin 107 and a slot 119 is formed therethrough, spaced apart from aperture 117, for pivotal and sliding receipt of second pivot pin 107. At the far corner 121 of lug 109, formed at the junctures of first and second curved edges 111 and 113, is pivotally mounted one end 123 of a short link 125, held thereto by a pivot pin 127. The other end 129 of link 125 is attached to wiper vane 91 by a raised knuckle 131 including a pivot pin 133.

FIG. 3 shows the arrangement of the particular configuration of the individual elements in a first position wherein first pivot pin 103 is positioned at one end of slot 105 and wiper vane 91 is furthest removed from fixed baffle 85 thereby making subchambers A and B of approximately the same size. In this position, outer lug edge 111 is positioned adjacent cylindrical walls 5. As a shock load is applied to lever arm 61, to cause twisting of operating shaft 49, a torque is applied to vane 91 thereby increasing the fluid pressure in subchamber A over that in subchamber B. Fluid is forced by this pressure differential through aperture 89 into subchamber B and simultaneously therewith wiper vane 91 rotates toward fixed baffle 85 and lug inner edge 113 approaches center shaft 39. In the position shown in FIG. 3, there is more rotational travel of wiper vane 91 per degree of rotation of work disk 69 and operating shaft 49 than in the second position shown in FIG. 4, where first pivot pin 103 is located at the other end of slot 105 and wherein a greater amount of rotational motion occurs to wiper vane 91 per degree of rotation of work disk 69 and operating shaft 49. During this rotation of vane 91, lug 109 pivots about first pivot pin 103 and moves toward shaft 39. During this motion, second pivot pin 107 moves across slot 119 in an oscillatory motion. This change in the amount of movement of vane 91 per degree of rotation of work disk 69 provides for the different ride characteristics of shock absorber 1.

What is claimed is:
1. An hydraulic shock absorber comprising:
 (a) a fluid-filled shock absorber chamber bounded by cylindrical walls and opposed, spaced-apart first and second chamber end plates including first means for anchoring said chamber to a frame;
 (b) a freely rotating shock absorber center shaft axially positioned in said chamber pivotally received in said first chamber end plate;
 (c) an operating shaft coaxially aligned with said center shaft in said chamber passing out through said second chamber end plate including second means for connection to a separate oscillatory member;
 (d) a work disk pivotally mounted inside said chamber intermediate said first and second end plates, in fluid sealing relationship with said cylindrical walls and fastened securely to said operating shaft;
 (e) a baffle fixedly mounted inside said chamber in fluid-sealing relationship therein having at least one aperture formed therethrough;
 (f) a wiper vane mounted on said center shaft intermediate said work disk and said first end plate extending outward into fluid-sealing relationship against said chamber walls, said vane, work disk and said first end plate effectively dividing said chamber into first and second subchambers, so that rotation of said center shaft forces fluid from said first subchamber through said aperture into said second subchamber;
 (g) a first pivot pin extending from said second end plate, through a circumferential slot formed in said work disk, into said chamber;
 (h) a second pivot pin, spaced-apart from said first pivot pin, extending from said work disk into said chamber;
 (i) a lug pivotally received on said first pivot pin and slidingly received on said second pivot pin having an arm extending outward around the inside of said chamber walls to a distal end adjacent said chamber walls when said vane is in a first position apart from said fixed baffle and said first pivot pin is at one end of said slot; and,
 (j) a moveable link pivotally attached between said distal end of said lug and said vane for urging said vane through said fluid causing said lug to pivot about said first pivot pin and rotate said work disk about said chamber walls to provide variable fluid flow from said first subchamber to said second subchamber as a nonlinear function of operating shaft rotation.

2. The hydraulic shock absorber of claim 1 wherein said center shaft is journalled in a sleeve bearing received in said first end plate.

3. The hydraulic shock absorber of claim wherein said operating shaft is journalled in a sleeve bearing received in said second end plate.

4. The hydraulic shock absorber of claim 1 wherein said work disk is mounted adjacent said second end plate.

5. The hydraulic shock absorber of claim 1 wherein said aperture includes means for adjusting the size thereof operative from outside said chamber walls.

6. The hydraulic shock absorber of claim 5 wherein said means includes:
 (a) an aperture formed through said cylindrical walls interior of said fixed baffle extending into and intercepting said aperture;
 (b) a moveable member threadably received in said aperture extending to a distal end; and,
 (c) a head on said member, located outside said cylindrical walls, for twisting said member and urging said distal end into said aperture.

7. The hydraulic shock absorber of claim 1 wherein said first pivot pin is located near said center shaft axis.

8. The hydraulic shock absorber of claim 1 wherein said second pivot pin is located near said chamber walls.

9. The hydraulic shock absorber of claim 1 wherein said means for anchoring said chamber to a frame includes a plate and a series of apertures formed in said plate for receipt therethrough of threaded fasteners.

10. An hydraulic shock absorber comprising:
 (a) a fluid-filled shock absorber chamber bounded by cylindrical walls and opposed, spaced-apart first and second chamber end plates including first means for anchoring said chamber to a frame;
 (b) a freely rotating shock absorber center shaft axially positioned in said chamber, pivotally received in said first chamber end plate including second means for connection to a separate oscillatory member wherein said center shaft is journalled in a sleeve bearing received in said first end plate;
 (c) an operating shaft coaxially aligned with said center shaft in said chamber passing out through said second chamber end plate including second means for connection to a separate oscillatory member wherein said operating shaft is journalled in a sleeve bearing received in said second end plate;

(d) a circular work disk pivotally mounted inside said chamber transverse mounted to said center shaft, adjacent said second end plate, in fluid-sealing relationship with said cylindrical walls;

(e) a baffle fixedly mounted inside said chamber in fluid-sealing relationship therein having at least one aperture formed therethrough and including means for adjusting the size thereof operative from outside said chamber;

(f) a vane axially mounted on said center shaft intermediate said disk and said first end plate extending outward into fluid-sealing relationship against said chamber walls, said vane, work disk and said first end plate effectively dividing said chamber into first and second subchambers, so that rotation of said center shaft forces fluid from said first subchamber through said aperture into said second subchamber;

(g) a first pivot pin extending from said second end plate, through a circumferential slot formed in said work disk, into said chamber;

(h) a second pivot pin, spaced-apart from said first pivot pin, extending inward from said work disk into said chamber;

(i) a lug pivotally received on said first pivot pin and slidingly received on said second pivot pin having an arm extending outward around inside said chamber walls to a distal end adjacent said chamber walls when said vane is in a first position apart from said fixed baffle and said first pivot pin is at one end of said slot; and, (j) a moveable link pivotally attached between said distal end of said lug and said vane for urging said vane through said fluid causing said lug to pivot about said first pivot pin and rotate said work disk about said chamber walls to provide variable fluid flow from said first subchamber to said second subchamber as a nonlinear function of operating shaft rotation.

11. The hydraulic shock absorber of claim 10 wherein said means for adjusting the size of said aperture from outside said chamber includes:

(a) an aperture formed through said cylindrical walls and interior of said fixed baffle extending into and intercepting said aperture;

(b) a moveable member threadably received in said aperture extending to a distal end; and, (c) a head on said member, located outside said cylindrical walls, for twisting said member and urging said distal end into said aperture.

12. The hydraulic shock absorber of claim 10 wherein said first pivot pin is located near said center shaft axis and said second pivot pin is located near said chamber walls.

* * * * *